United States Patent
Michaelis et al.

(10) Patent No.: US 9,015,130 B1
(45) Date of Patent: Apr. 21, 2015

(54) AUTOMATIC ADJUSTMENT OF EMAIL FILTERS BASED ON BROWSER HISTORY AND TELECOMMUNICATION RECORDS

(75) Inventors: Paul Roller Michaelis, Louisville, CO (US); David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 1056 days.

(21) Appl. No.: 12/055,071

(22) Filed: Mar. 25, 2008

(51) Int. Cl.
*G06F 17/30* (2006.01)
*G06F 13/14* (2006.01)

(52) U.S. Cl.
CPC .................................. *G06F 13/14* (2013.01)

(58) Field of Classification Search
None
See application file for complete search history.

(56) References Cited

U.S. PATENT DOCUMENTS

| | | | |
|---|---|---|---|
| 6,161,130 A * | 12/2000 | Horvitz et al. | 709/206 |
| 7,181,764 B2 * | 2/2007 | Zhu et al. | 726/4 |
| 7,222,158 B2 * | 5/2007 | Wexelblat | 709/206 |
| 7,225,407 B2 * | 5/2007 | Sommerer et al. | 715/738 |
| 7,287,060 B1 * | 10/2007 | McCown et al. | 709/206 |
| 7,359,941 B2 * | 4/2008 | Doan et al. | 709/205 |
| 7,369,867 B2 * | 5/2008 | Zabawskyj et al. | 455/466 |
| 7,603,422 B2 * | 10/2009 | Murphy et al. | 709/206 |
| 7,653,606 B2 * | 1/2010 | Loughmiller et al. | 706/20 |
| 7,836,061 B1 * | 11/2010 | Zorky | 707/749 |
| 7,987,182 B2 * | 7/2011 | Slothouber et al. | 707/722 |
| 2002/0199095 A1 * | 12/2002 | Bandini et al. | 713/151 |
| 2004/0260776 A1 * | 12/2004 | Starbuck et al. | 709/206 |
| 2005/0256930 A1 * | 11/2005 | Pearson et al. | 709/206 |
| 2006/0080303 A1 * | 4/2006 | Sargent et al. | 707/3 |
| 2006/0122957 A1 * | 6/2006 | Chen | 707/1 |
| 2006/0168035 A1 * | 7/2006 | Cai et al. | 709/206 |
| 2006/0184500 A1 * | 8/2006 | Najork et al. | 707/1 |
| 2006/0195542 A1 * | 8/2006 | Nandhra | 709/207 |
| 2007/0027992 A1 * | 2/2007 | Judge et al. | 709/227 |
| 2007/0038600 A1 * | 2/2007 | Guha | 707/3 |
| 2007/0078849 A1 * | 4/2007 | Slothouber | 707/5 |
| 2007/0101423 A1 * | 5/2007 | Oliver et al. | 726/22 |
| 2007/0156886 A1 * | 7/2007 | Srivastava | 709/224 |
| 2007/0213079 A1 * | 9/2007 | Dubin et al. | 455/466 |
| 2007/0294351 A1 * | 12/2007 | El-Emam | 709/206 |
| 2008/0084975 A1 * | 4/2008 | Schwartz | 379/88.22 |
| 2008/0123861 A1 * | 5/2008 | Chow | 380/279 |
| 2009/0106300 A1 * | 4/2009 | Brown | 707/102 |
| 2009/0150497 A1 * | 6/2009 | McAfee et al. | 709/206 |

(Continued)

FOREIGN PATENT DOCUMENTS

WO    WO 2005/082101    9/2005

OTHER PUBLICATIONS

Computer Mail Services, Inc., "Praetor Feature/Benefit List", Available at http://www.cmsconnect.com/Praetor/FeatureChecklist,htm, copyright 2006, 6 pages.

(Continued)

*Primary Examiner* — Bai D. Vu
(74) *Attorney, Agent, or Firm* — Sheridan Ross P.C.

(57) ABSTRACT

The present invention, in one embodiment, is directed to a spam filter 132 that identifies, based on a likely interest of a user, electronic text messages addressed to the user as being spam or non-spam and determines a likely interest of the user using at least one of the following: (i) at least part of a search query provided to a search engine; (ii) content of at least one web page selected by the user during a browsing session; (iii) content of a cookie; (iv) a live voice electronic address; and (v) an entry in an electronic calendar of the user.

19 Claims, 3 Drawing Sheets

(56) References Cited

U.S. PATENT DOCUMENTS

2009/0222917 A1* 9/2009 Mills et al. .................. 726/22
2011/0087648 A1* 4/2011 Wang et al. .................. 707/709

OTHER PUBLICATIONS

McAfee, "McAfee System Protection McAfee SpamKiller for Mail Servers" Available at http://www.mcasfee.com/sg/products/mcafee/antispam/spk_mailserver.htm, copyright 2005, 4 pages.
Seattle Pacific University, "Computer and Information Systems", Available at http://www.spu.edu/cishelpdesk/email/filtering2.asp, copyright 2003, 3 pages.
Informit.com "Stopping Spam at the Server: Part III", Available at http://www.informit.com/articles.asp?p=169638&r1=1, copyright 2006, 6 pages.
Eide, Kristian, "Winning the War on Spam: Comparison of Bayesian Spam Filters", Available at http://home.dataparty.no/kristian/reviews/bayesian/, Mar. 4, 2003, 13 pages.
Carnegie Mellon University, Using the Andrew Spam Filter; Through My Andrew, Available at http://www.cmu.edu/computing/documentation/spam/spamfilter.html, Oct. 21, 2004, 11 pages.
University of Cambridge, Department of Pure Mathematics and Mathematical Statistics, "Spam Tagging of E-mail for DPMMS", Available at http://dpmms.cam.ac.uk/Computing/spam.html, Sep. 29, 2005. 3 pages.
"Spam Management of the CalMail System", Available at http://mailinfo.berkely.edu/, Feb. 15, 2004, 10 pages.
Rensselaer Help Desk, "How do the spam filtering options work?", Available at http://helpdesk.rpi.edu/update.do?artcenterkey=514, Jan. 31, 2006, 4 pages.
FlashPeak, "Slim Browser", Available at http://www.flashpeak.com/sbrowser/, copyright 2001-2005, 3 pages.
O'Reily, "Web Admin", Available at http://www.perl.com/cs/user/query/q/6?id_topic=78, copyright 2000-2006, 4 pages.
Exacttrend, "Web Log Suite—Log Analyzer", Available at http://exacttrend.com/weblogsuite/, copyright 2001-2006, 4 pages.
Summary We Tell You More, "Products", Available at http://www.summary.net/summary.html, copyright 1998-2005, 3 pages.
Web Page—Wikipedia, the free encyclopedia, Available at http://en.wikipedia.org/wiki/Web_page, Feb. 25, 2008, 6 pages.
Web Document—Wikipedia, the free encyclopedia, Available at http://en.wikipedia.org/wiki/Web_document, Feb. 25, 2008, 3 pages.
HTML—Wikipedia, the free encyclopedia, Available at http://en.wikipedia.org/wiki/HTML, Feb. 25, 2008, 18 pages.
HTTP cookie—Wikipedia, the free encyclopedia, Available at http://en.wikipedia.org/wiki/HTTP_cookie, Feb. 25, 2008, 20 pages.
Domain name—Wikipedia, the free encyclopedia, Available at http://en.wikipedia.org/wiki/Domain_name, Feb. 25, 2008, 11 pages.
Homepage—Wikipedia, the free encyclopedia, Available at http://en.wikipedia.org/wiki/Homepage, Feb. 25, 2008, 1 page.
Website—Wikipedia, the free encyclopedia, Available at http://en.wikipedia.org/wiki/Website, Feb. 25, 2008, 8 pages.
Whitelist—Wikipedia, the free encyclopedia, Available at http://en.wikipedia.org/wiki/Whitelist, Feb. 25, 2008, 3 pages.
Blacklist—Wikipedia, the free encyclopedia, Available at http://en.wikipedia.org/wiki/Blacklist, Feb. 25, 2008, 5 pages.
Graham, Paul, "A Plan for Spam," available at http://www.paulgraham.com/spam.html, Aug. 2002, 20 pages.
"Dealing with Spam", available at http://security.fnal.gov/handouts/DealingWithSpam.pdf, printed Apr. 11, 2006, 4 pages.
Science and Engineering at the University of Edinburgh, School of Informatics, "Dealing with Spam," available at http://www.inf.ed.ac.uk/systems/email/spamfilter/spamfilter.html, printed Apr. 11, 2006, 3 pages.
Tufts University, TCCS IT Training and Document Department, "TCCS Training and Documentation Filtering Spam with Outlook XP—Tip Sheet", 2003, available at http://web.archive.org/web/20031016043545/training.tccs.tufts.edu/pdftips/OutlkSpamTips.pdf, 3 pages.
Koutsioupis, Christos, "Anti-Spam at the University of Cyprus," University of Cypress, available at http://www.ucy.ac.cy/security/docs/WhydoIgetSPAM.pdf, Jan. 13, 2005, pp. 1-14.
"MoreEmail. Less Junkmail: Spam Filter," available at http://web.archive.org/web/20051028105431/http://www.greencomputer.com/products/powerelf2/features/pdf/anti_ube.pdf, 2005 (printed Apr. 11, 2006), 6 pages.
"Spam Karma Documentation," available at http://web.archive.org/web/20051220210536/http://www.jonabad.com/spamkarma/sk_doc.html, 2005 (printed Apr. 11, 2006), 12 pages.
Turnbull, Don "Web Tracker: A Tool for Understanding Web Use," available at http://www.ischool.utexas.edu/-donturn/research/webtracker/index.html, 1998 (printed Apr. 12, 2006), 8 pages.
"Apache HTTP Server Version 1.3; Module modJog_common," available at http://httpd.apache.org/docs/1.3/mod/mod_log_common.html, printed Apr. 12, 2006, 2 pages.
"The Browser-History Web Page," available at http://colas.nahaboo.net/browser-history/, revised Jul. 2000 (printed Apr. 12, 2006), 7 pages.

* cited by examiner

AUTOMATIC ADJUSTMENT OF EMAIL FILTERS BASED ON BROWSER HISTORY AND TELECOMMUNICATION RECORDS

FIELD OF THE INVENTION

The invention relates generally to text messaging filters and particularly to email and instant messaging filters, such as white lists and black lists.

BACKGROUND OF THE INVENTION

Electronic mail (e-mail) is one of the most commonly used applications for distributed computer networks. E-mail refers to the transmission of messages, which may include further messages and/or files as attachments, by computer from one person to another. E-mail provides better connectivity and fast communication between network users. If a person is either unavailable or unwilling to pick up a message immediately, the message is stored until that person can review the stored message at a later time. E-mail messages also provide a quick and easy way to package information such as sales reports, graphics, and other data for transfer to another user by simply attaching the information to the message. Business users increasingly rely on e-mail messages to share ideas, transmit documents, schedule meetings, and perform a multitude of other everyday tasks.

Due to technological improvements in the past decade, there has been a dramatic increase in the number of unwanted, and potentially destructive, e-mails (referred to as "spam") received by users throughout the world. Spam is commonly unsolicited and blindly directed to individuals with a commercial or malicious intent. It is estimated that over 50% of all e-mail traffic is spam, causing excessive congestion in the e-mail network and Internet Service Providers (ISPs) and other organizations to spend resources processing and managing unwanted traffic. Worse, some spammers use e-mail as a preferred modality for distributing computer worms and viruses or message recipients as relay hosts to send spam to destinations maintained by the message recipient. Spam frequently obfuscates or spoofs header information to hide the e-mail source. To combat this electronic epidemic, laws, guidelines, and technological safeguards have been implemented in the past few years to reduce the number of unsolicited e-mails received by computer users.

Spam filters are one safeguard that identifies spam. Spam filters typically apply fixed, trainable, or user configurable rule sets, such as heuristic content analysis, to identify e-mail having at least a selected probability of being spam. Spam filters often perform the analysis on e-mail before the messages are passed from the gateway to the e-mail servers of the enterprise network.

Spam filters can apply one or more layers of analysis.

A first analytical layer looks for messages that originate from invalid computer domains. This type of origination information indicates that the senders are not legitimate or the address has been forged. E-mails that fit this category are rejected at the server level.

A second analytical layer compares the sender's address against a list of known spammers on a "Registered Black List" or RBL. E-mail messages from known spammers are thereby rejected.

A third analytical layer scans the headers and bodies of e-mails for one or more keywords, attachments, links, formats, and/or source addresses indicative of spam. For example, e-mail address mismatches (when the "from" address does not match the domain address of the server that sent the message), use of random, typically all upper case, characters or other key words in the subject line or message body, or inclusion of one or more forwards, one or more or "opt-out links, one or more "click here" links, a graphical image or active HTML script, or re-direct can all be indicative of spam. Based on the identified spam indicia (or rule matches/violations) ratings or scores are assigned to the e-mail. The scores represent a probability that the e-mail is or is not spam. E-mails having scores indicative of spam are quarantined in a spam folder, flagged, highlighted or otherwise indicated as being likely spam (e.g., by modifying the subject line of the e-mail), and/or automatically rejected or deleted. Whitelists, or lists of sources from whom the user desires to receive e-mail, can also be applied to circumvent e-mail analysis for e-mails from wanted sources.

Some spam filters use a Bayesian content filter applying advanced statistical techniques to provide greater spam detection accuracy. Bayesian filters can be trained by each user simply by categorizing each received e-mail as either spam or non-spam. After the user has categorized a few e-mails, the filter can begin to make this categorization by itself and usually with a very high level of accuracy. If the filter makes a mistake, the user re-categorizes the e-mail, and the filter learns from the re-categorization.

There are many products using one or more of these layers. For example, one example is the "Rules and Alerts" option in Microsoft Outlook™. This option allows users to specify how incoming messages are to be handled based on properties, including the originator, the addresses, and the presence of key words or phrases in the message subject or body.

Despite these sophisticated spam detection methodologies, there is still a relatively high rate of false-positive (in which an e-mail is improperly identified as spam) and false-negative (in which an e-mail is improperly identified as non-spam) rates. An example of where existing spam filters fail arises from a person's interaction with a website. For example, when an individual is in the midst of shopping for a specific item and has previously enabled the "block all advertising" rule, the filter is likely to block messages that could be of interest. This could include messages that might have been sent in response to an Internet or telephone query. This is disruptive to the intent of the individual and to the merchant's ability to service the individual. The reason for this problem is that people rarely adjust their email filters to reflect their current needs or interests.

SUMMARY OF THE INVENTION

These and other needs are addressed by the various embodiments and configurations of the present invention. The invention is directed generally to spam filters using various collected indicia to determine likely interests of a user, which are then used to filter spam from non-spam messages.

In one embodiment, a method includes the steps:

(a) receiving an electronic text message addressed to a user;

(b) determining a likely interest of the user using one or more of the following indicia:

(B1) at least part of a search query provided to a search engine;

(B2) content of at least one web page selected by the user during a browsing session;

(B3) content of a cookie;

(B4) a live voice electronic address; and (B5) an entry in an electronic calendar of the user; and (c) based on a determined likely interest of the user, determining whether the electronic text message is spam or non-spam.

The invention can modify a user's email filtration rules to permit the passage of items judged to be of value to the user. For example, web sites such as "expedia.com" and "travelocity.com" are noticed in a recent browser history. The email filters are adjusted automatically to permit unsolicited emails from airlines and hotel chains. In another example, Google searches for "LCD wide-screen televisions" are noticed. The email filters are adjusted to permit unsolicited emails from television manufacturers, vendors and service providers. In another example, telephone records contain recent calls to a variety of automobile dealers. The email filters are adjusted to permit unsolicited emails from automobile dealers and manufacturers.

In another embodiment, a spam filtering method includes the steps:

(a) maintaining a set of data structures (e.g., whitelist or blacklist), the data structures including a number of objects and, for each object, a persistency level and/or life, the persistency level and/or life indicating when an associated object is to be removed from the set of data structures;

(b) receiving an electronic message addressed to a user; and (c) applying the following rules:

(C1) when the electronic message contains an object that is in the set of data structures, when the object is an indicator of an interest of the user, and when the object has an unexpired at least one of persistency level and life, increasing a likelihood that the electronic message is non-spam; and (C2) when the electronic message contains an object that is in the set of data structures, when the object is an indicator of a disinterest of the user, and when the object has an unexpired at least one of a persistency level and life, decreasing a likelihood that the electronic message is non-spam.

This embodiment provides a mechanism to make filtration rule changes non-permanent. For example, if the presence of "expedia.com" and "Travelocity.com" in the browser history caused unsolicited emails from airlines and hotel chains to be permitted, a subsequent lack of recent travel-related browser activity or telephone history could cause the original blocking rules to be reactivated automatically. The definition of "recent activity" could include factors, such as whether there has been relevant web or phone activity within the past X number of user-initiated actions and/or Y number of days. In one implementation, the values of X and Y are under the user's control and could be specified individually for each filtration rule.

When an automatic email filter notification conflicts with previously blocked sources of content, the application could query the user what their decision is in regard to the modification. For example, a certain vendor may be a source of spam and, even when the user's current interests align with the services offered by that vendor, the user may wish to continue blocking content from that source.

The present invention can provide a number of advantages depending on the particular configuration. By monitoring the user's actions and behavior and automatically identifying and assigning probative values to objects of potential interest to the user, the temporally changing interests of the user can be identified and handled dynamically. The user no longer needs to adjust his or her email filter to reflect current needs or interests. Even messages that are sent in response to an isolated Internet or telephone query can be identified as non-spam. The automatic filtration rule adjustment is generally time-limited to prevent email from being received or blocked indefinitely. Conflicts between temporary enablement rules and pre-existing filtering rules can be resolved by prompts/queries to the user. The invention can increase productivity by reducing information overload and spam while avoiding the inappropriate filtering of email that was misidentified as being undesirable.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The term "cookie" refers to web or HyperText Transfer Protocol (HTTP) cookies. Web cookies are typically parcels of text sent by a server to a web browser and then sent back unchanged by the browser each time it accesses that server. HTTP cookies may be used for authenticating or differentiating between users, tracking and maintaining specific information about users. Examples of such information include information collected during user navigation through a web site. For instance, this information can be site preferences or the contents of their shopping carts.

The terms "determine", "calculate" and "compute," and variations thereof, as used herein, are used interchangeably and include any type of methodology, process, mathematical operation or technique.

A "HAM score" refers to a level of confidence that a selected electronic text message is not spam or non-spam.

The term "HTML refers to the HyperText Markup Language and is generally defined to include any type of markup language, whether or not in an XML-descended form (such as XTML 1.0 and later) or a form descended directly from SGML (such as HTML 4.01 and earlier).

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

"Spam" refers to an electronic text message that is posted to a large audience via a Wide Area Network (WAN), such as the Internet. An example of a spam email is an email sent indiscriminately to all available newsgroups or all possible addresses.

A "web page" refers to a resource of information that is suitable for the World Wide Web and can be accessed through a web browser. This information is typically in HyperText Markup Language (HTML) or XHTML format and may provide navigation to other web pages via hypertext links. A web page can either be a single (HTML) file or made up of several (HTML) files represented using frames.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

Figure 1:
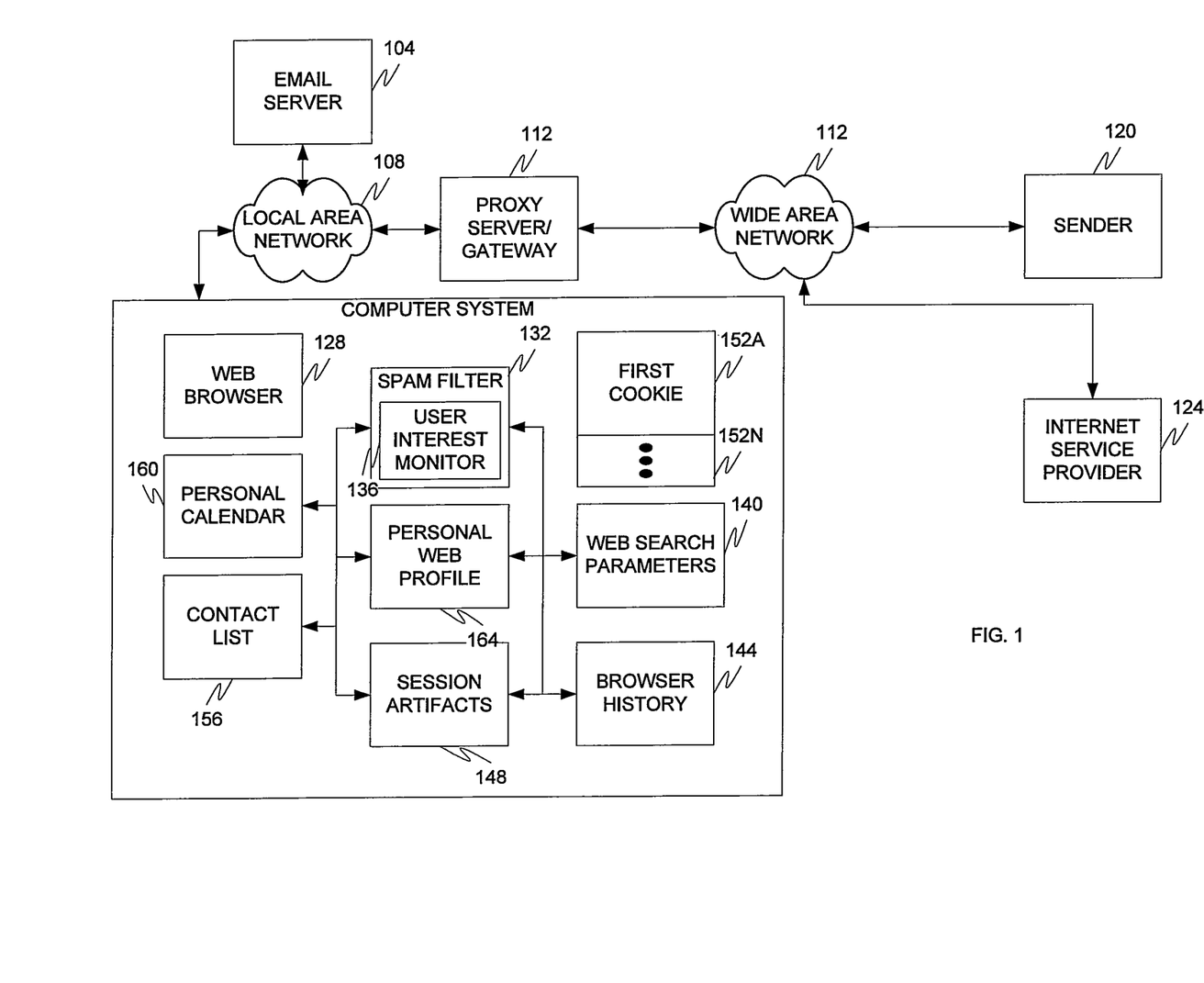
FIG. 1 is a block diagram of an architecture according to an embodiment of the present invention.

FIG. 1 illustrates a typical client-server architecture in which the present invention operates.

A computer system ("client") 100 is connected, via Local Area Network or LAN 108, to an e-mail server 104, which is typically an enterprise network server. The client 100 can be any computational endpoint providing e-mail access, such as a Personal Computer, a laptop, a Personal Digital Assistant, a cellular phone, kiosk, and the like. In typical applications, the server 104 stores files, such as e-mail, that are available to other computer systems, or clients, connected to the LAN 108. For example, the e-mail server 104 manages message traffic and mail boxes for users. As will be appreciated, the LAN 108 is a wireless and/or wired network interconnecting the client 100 and e-mail server 104.

To obtain information from the e-mail server 104, a client 100 makes a request, via the LAN 108 and a specified protocol, for a file or information located on the server 104. As will be appreciated, the Internet often uses a message standard, known as a Simple Mail Transfer Protocol (SMTP), which works in conjunction with a user's e-mail program and defines the control messages used by two computers to exchange e-mail messages. Upon reception of a properly formatted request, the server 104 downloads the file or information from a server store (not shown) to a storage (not shown) located at the client.

The server 104 is connected to a Wide Area Network or WAN 112, such as the Internet, typically via a proxy server and/or gateway 116. The proxy server and/or gateway enable the client 100 to communicate via e-mail and the TCP/IP suite of protocols with other computational components, such as sender 120. As will be appreciated, the proxy server and/or gateway 112 act(s) as an intermediary between the client 100 and Web servers, such as sender 120 and/or provide(s) translation facilities that allow message exchange between different types of e-mail programs or applications using different messaging protocols.

An Internet Service Provider or ISP 124 is a server operated by a company providing its customers with access to the Internet, typically through dial-up networking. Major service providers include, for example, Mindspring™, America Online™, Compuserve™, and Prodigy™. The ISP 124 provides file space for pages on the Web and e-mail storage.

The client 100, e-mail server 104, proxy server and/or gateway 116, and ISP 124 include a variety of conventional software components. Specifically, an e-mail server application (such as unix mail, Groupwise™ by Novell, and/or Microsoft Exchange™ by Microsoft Corporation) (not shown) is resident in the client and e-mail server, a local (central) message store in the server (not shown) to store e-mail messages, a group assistant (not shown) in the server to extract selected information from the messages received by the server 104 and store the (full text) messages to the local store of the server 104, a message notification agent (not shown) in the client to receive the selected information from the group assistant and notify the client that an e-mail message intended for the client has been received by the server 104, a message manager (not shown) in the server for managing the messages in the local store, a local message store (not shown) in the client containing one or more queues of notification (or partial text e-mail) messages from the message notification agent, storage in the client for archiving full text e-mail messages, and a message manager (not shown) in the client for managing the messages in the client's local store and/or database. The client 100 further includes a web browser 128, such as Netscape™, Mozilla Firefox™, or Microsoft Internet Explorer™, to enable the client to read selected content, such as Hypertext Markup Language (HTML), in files or on the Web.

One or more of the ISP 124, proxy server and/or gateway 116, e-mail server 104, and client 100 contains a spam filter 132 that analyzes incoming e-mail to identify spam. The filter can perform one or more of the three levels of analysis referenced above, namely whether the selected e-mail message originates from an invalid computer domain, whether the e-mail source address is associated with an entry on a list of known spammers on a "Registered Black List" or RBL, and whether content analysis of the header and body of the e-mail provides a "HAM" score or rating indicative of spam. However, the filter 132, unlike conventional filters, includes a user interest monitor 136 to monitor user relevant events, identity areas of potential interest to the user, and determine a likelihood that the e-mail is of interest to the user. When the e-mail is of significant potential interest to the user, the filter appropriately adjusts the score or rating to decrease the likelihood that the e-mail is spam. Although the invention is discussed with reference to email, it is to be understood that the principals of the invention can be applied to other electronic types of text messaging, such as instant messaging and text or web chat.

The user interest monitor 136 can consider a number of different sources in divining the interests of the user.

One source is the user's Web term search parameter(s) 140, using a search engine, such as Google™, Go Ask Jeeves™, and Yahoo!™ or inputted into a local search engine at the visited web site. As will be appreciated, caches of search terms are maintained by most search engines. Additionally or alternatively, search parameters can be tracked and stored by the monitor 136. The relative importance of search parameters can further be assigned based on the duration of the search, the frequency of use by the user of the search terms, the web site selected by the user, and the outcome of the search. For instance, if the user saved a URL located during the search in his "Favorites" folder the search would be deemed to be a more important indicator of an interest of the user. Likewise, if the user performs a search to locate mapquest.com the nature of the site indicates that the search is not an important indicator of an interest of the user.

Another source is the browser log or history 144 generated whenever a user conducts a web browsing session. The browser log, like the search parameters, can be maintained at multiple locations. They can be maintained by the browser 128 and/or monitor 136 not only at the computer system 100 as shown but also at the proxy server 116, Internet Service Provider (ISP) 124, and/or a visited web site. When maintained at the proxy server 116, ISP 124, and/or visited web site, they are typically maintained on a per-subscriber or user basis. A typical browser log includes a number of fields, including user identifier (which identifies the browsing user uniquely (such as by client address, password, and the like) and is optional), browser command/request (which indicates the operation performed by the user at the corresponding visited web server), time stamp (which indicates the time at which the corresponding command/request was submitted by the client), URL visited (which identifies the URL of the web content accessed), and web page title (which indicates the title of the page corresponding to the respective identified URL). As will be appreciated, browser logs are currently maintained by most web browsers to track the state of the browsing session.

As will be appreciated, the log can be of a variety of other forms and include additional or fewer items depending on the application. More elaborate logs, such as those maintained by log analyzer products (e.g., Browser-History by Colas Nahaboo of the Koala project, and Webtracker by the University of Toronto) can be used. Such logs can collect additional information including, without limitation, the interface object selected by the user (e.g., button, menu, key, etc.), browser commanded action (e.g., back, forward, reload, home, search, guide, print, security, stop, file new, file open, save as, send page, print preview, etc.), and the corresponding user activity causing the commanded action.

The log examined may be not only the detailed log of the browser, which tends to be transient (because it is maintained for a matter of days), but also more persistent lists of URLs, such as the "favorites" (which lists URL's selected and saved by the user for long periods). The filter can also examine, for matches, client caches containing the accessed web content. Such caches store web content so that, when a user hits "back" the browser can display the prior content (or web page) without having to reload it from the corresponding web server.

Other sources are browsing session artifacts 148. Examples of such artifacts include the web pages selected by the user, the order in which the web pages are selected, and web page objects, or links, selected by the user. As will be appreciated, web pages can be static or dynamic. Static web pages include files of static text stored within the web server's file system while dynamic web pages are constructed by the web server using XHTML when the web page is requested by the browser. Unlike static web pages, dynamic web pages commonly are not associated with a permalink, or a static URL. Dynamic web pages are generated dynamically in response to user input and can be considered as a type of filter of the user's interests. As the web site session progresses, the dynamic web page content becomes more and more specific as to the user's interests. As an example, a first web page of a retail clothing store's web site would describe general product classes, such as coats, pants, shoes, jackets, and the like. After selecting several objects in descendant web pages, the user is provided with a web page containing men's wing-tip dress shoes manufactured by a specific manufacturer.

Web pages include perceived (rendered) and internal (hidden) information. Perceived information includes textual information, non-textual information, and interactive information. Internal information includes comments, metadata with semantic meta-information, diagramation and style information, and scripts. The monitor 136 can collect relevant user interest indicators from the user's interaction with either or both perceived and internal information.

In one configuration, HTML elements selected by the user are identified and tracked during the session. As will be appreciated, elements have two properties, namely attributes and content. Each attribute and each element's content has certain restrictions that must be followed for an HTML document to be considered valid. An element usually has start and end tags. The element's attributes are contained in the start tag and content is located between the tags. Examples of attributes include an element identifier or name, class (which indicates that all elements with this class value are subordinate to the main text of the document), style (which is a non-attributal code presentational property), and title (which attaches subtextual explanation to an element). Structural markup describes the purpose of the text and can be of particular interest to the monitor 136. In an example, as the user selects and clicks on differing links of displayed web pages during a session with a web site, the element information, or HTML tag, associated with the link can be parsed and used by the monitor 136 to identify user interests. Equally relevant and parseable by the monitor 136 are the links on a given web page not selected by the user. Both selected and non-selected links can be used to identify, more narrowly, the user's interests.

Another artifact 148 potentially indicating the user's interest is the character string, or URL, in the address dialog box of Microsoft Internet Explorer™. In a well constructed web site, the character string provides the full path to the currently selected web page. Frequently, the character string is self-descriptive and can be parsed and understood by the monitor 136.

Other sources of user interest information include first, ... nth 152a-n cookies stored by the web browser 128 on the system 100. Cookies can contain probative information, such as shopping cart contents. The shopping cart contents can be indicative of continued or discontinued interest of the user.

Although probative of user interest, cookies are used with caution because they are often not a reliable indicator of the user's current interests. Users do not control what cookies are pushed to them. Cookies can provide inaccurate user identification. Cookies do not identify a person but a combination of user account, computer, and a web browser. Anyone using multiple accounts, computers or browsers has multiple sets of cookies. Cookies may be attacked by hackers using techniques such as cookie hijacking, cookie poisoning, and cross-site cooking. To avoid these problems, cookies are generally used only when they are related or relevant to other interest sources, such as search terms or web page elements. This relatedness enables the monitor 136 to sort between cookies pushed to the user without the user's consent and those pulled by the user as part of a web site visitation.

Another source of interest probative information is the user's contact list 156 or repository of contact information. This contact list contains not only email addresses and instant message handles but also phone numbers. The monitor 136 can use electronic addresses in the contact list to divine senders of interest to the user. Even if not in the contact list, the monitor 136 can ascertain phones numbers and other electronic addresses by monitoring user activities on the system 100. When a VoIP call is made using the system 100, the called number can be stored by the monitor. When a VoIP call is received by the system 100, the calling number can also be stored by the monitor. The monitor can then map the stored phone numbers using an online service, such as Qwestdex.com, to provide a description of the callee or caller, as appropriate.

Another source of interest information is the personal electronic calendar 160 of the user. The personal calendar 160 can provide scheduled or planned activities of the user and emails relevant to those activities are likely not spam. For example, if an upcoming long distance trip to a city is on a user's electronic calendar emails from airlines could be related to the trip and not spam.

Another source of user interest information is a personal web profile or web site 164 maintained by the user. A personal web site typically contains personal information about a user, including the user's professional and personal interests. This information, however, is frequently very non-specific and not temporally sensitive; therefore, it is generally not too helpful in dividing the user's immediate interests.

Another source of user interest information is the user's treatment of stored text messages. For example, opened emails are of greater interest to the user than emails that are never opened or deleted before they are opened. Saving a text message to a separate file is in indication of user interest. Different types of text messages, such as instant messages and emails, relating to or involving common objects are also indicative of user interest.

In one configuration, the object of interest is not literally, but conceptually, referenced in a document or field of interest. This conceptual use can be determined using conceptual analytical techniques.

Data structures used by the present invention will now be discussed.

Figure 2:
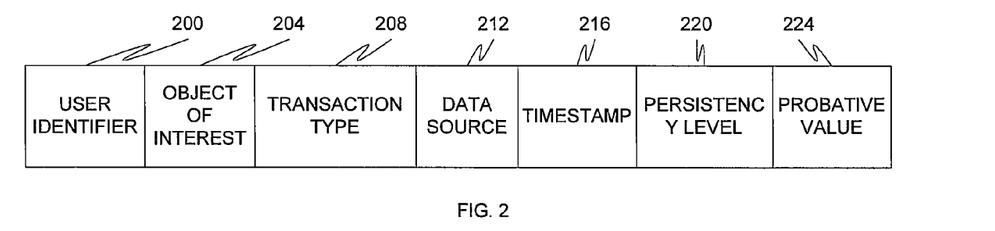
FIG. 2 depicts a first set of data structures according to an embodiment.

Referring to FIG. 2, a set of data structures containing collected interest information is depicted. The data structures include a user identifier 200 identifying the user with whom the interest information is associated, the object of interest 204 (collected by the monitor 136), the transaction type 208, the data source 212, the timestamp 216, the persistency level 220, and the probative value 224. The object of interest 204 can be, for example, a URL, a web search parameter(s), selected cookie content(s), a web page element or attribute, a scheduled activity, a caller or callee identity or electronic address, a manufacturer's name or electronic address, a service provider's name or electronic address, a retailer's name or electronic address, navigation path chosen by the user to arrive at a particular interesting item and the like. The transaction type 208 indicates the type of user interaction that produced the associated object of interest 204. For example, the transaction type can be a web search using a search engine, a voice call, an electronic business transaction performed using the web (e.g., a purchase of a product or service), a web site visit, launching information links, navigating to a related web site for more information, and the like. The data source 212 is an identifier of the source of the associated object of interest. Examples of data sources include a specified or identified cookie, search engine, web site URL, an electronic calendar, a VoIP application, clickable icons within a URL and the like. The timestamp indicates the time at which the corresponding object of interest was collected. Finally, the persistency level 220 indicates the temporal life of the object of interest. Commonly, the relevancy of an object of interest is relatively short. This is reflected by a persistency level associated with a relatively short life. When the life expires, the entry is deleted from the data repository. Certain types of transactions, however, have relatively long lives. For example, if the user purchased a product or service through a web transaction, the user will likely continue to receive, from the source web site, relevant product or service information, such as hardware or software upgrades, warranty information, product recall notices, ancillary products or services, refund information, coupons, subscription renewal or termination notices, and the like. To avoid too much stored information from being collected, most stored objects of interest are given relatively short lives. The probative value 224, or level of confidence, is a value indicating how valuable the object of interest is in divining the temporally changing interests of the user. In one configuration, the probative value 224 is related to a HAM score adjustment discussed below. The probative value 224 can be a function not only of the object of interest 204 but also of the transaction type 208 and data source 212.

Figure 3:
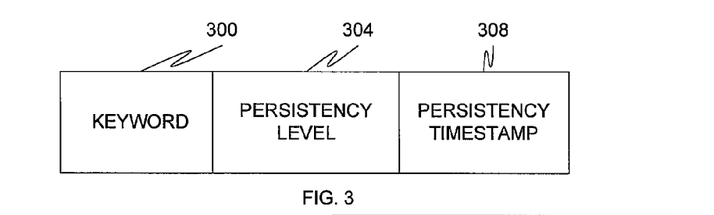
FIG. 3 depicts a second set of data structures according to an embodiment.

FIG. 3 shows a whitelist according to an embodiment of the invention. The whitelist includes a keyword 300, an associated persistency level 304, and/or persistency life or timestamp 308. The keyword can be a string of characters to be found in any field of a text message, such as source address field, subject matter field, cc field, and text message body. The string of characters can thus be, for example, a part of an electronic address or one or more numeric, alphabetical, or alphanumeric symbols (e.g., words or phrases). The persistency level 304 has been discussed previously. The persistency timestamp 308 is a life of the corresponding keyword 300 based on the persistency level 304. The persistency timestamp 308 is the sum of the timestamp 216 and the lifetime of the associated persistency level 220. When the persistency timestamp expires, the corresponding keyword 300 is removed from the whitelist. As can be seen from FIG. 3, different keywords 300 can have differing persistency levels 304 and persistency timestamps 308.

Figure 4:
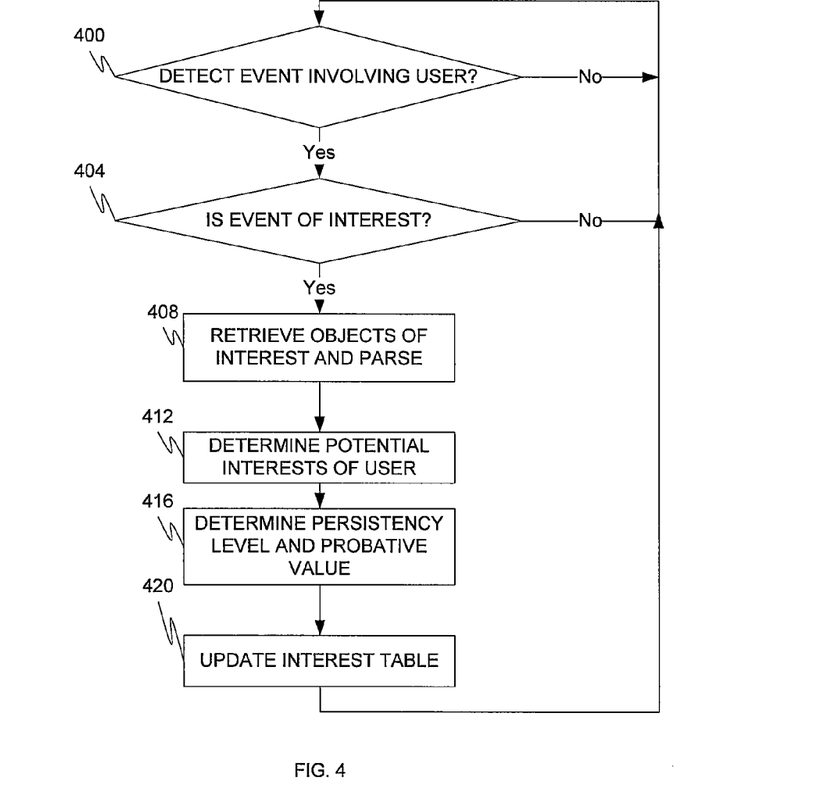
FIG. 4 is a flowchart of an operation of a user interest monitor according to an embodiment.

An operation of the monitor 136 will now be discussed with reference to FIG. 4.

In decision diamond 400, the monitor 136 determines whether an event involving the user has occurred. The event can be a web browsing selection, a voice call, an electronic calendar update, entry of a web search phrase, multimedia web interaction and the like. When an event is detected, control passes to decision diamond 404.

In decision diamond 404, the monitor 136 determines whether or not the event has produced or may produce an object of interest 204. When the event has or may produce an object of interest 204, control passes to step 408.

In step 408, the monitor 136 identifies and retrieves an item and, if necessary, parses the object to identify an object of interest. The item is typically a textual document or portion thereof.

In step 412, the monitor 136 determines, from the object of interest, one or more potential interests of the user.

In step 416, the monitor 136 determines, based on the identified potential interest, a persistency level 416 and probative value 224 to be assigned to the object of interest.

In step 420, the monitor 136 updates the set of data structures of FIG. 2 and returns to decision diamond 400.

In one configuration, the above steps are performed in close temporal proximity to the detected event. This is so because interests of the user typically change dramatically over time. Too long a delay between the event and event detection can cause the monitor 136 to operate ineffectively, inaccurately, and inefficiently. By way of example, entries in the browser history and contact list are generally disregarded unless they have timestamps within a certain time threshold of the performance of the above steps.

In one configuration, the object of interest, persistency level 220, and/or probative value 224 is/are determined by threading topics. When the user is multi-tasking, such as moving back and forth between differing, unrelated searches, the events can be analyzed topically and separated from one another.

In one configuration, the object of interest, persistency level, and/or probative value is/are determined by pattern matching or frequency of use. For example, if a user performs the same search each week, the search terms are highly probative of the user's interests. In other words, more frequently occurring objects of interest are generally more probative of the user's interests than less frequently occurring objects of interest.

Figure 5:
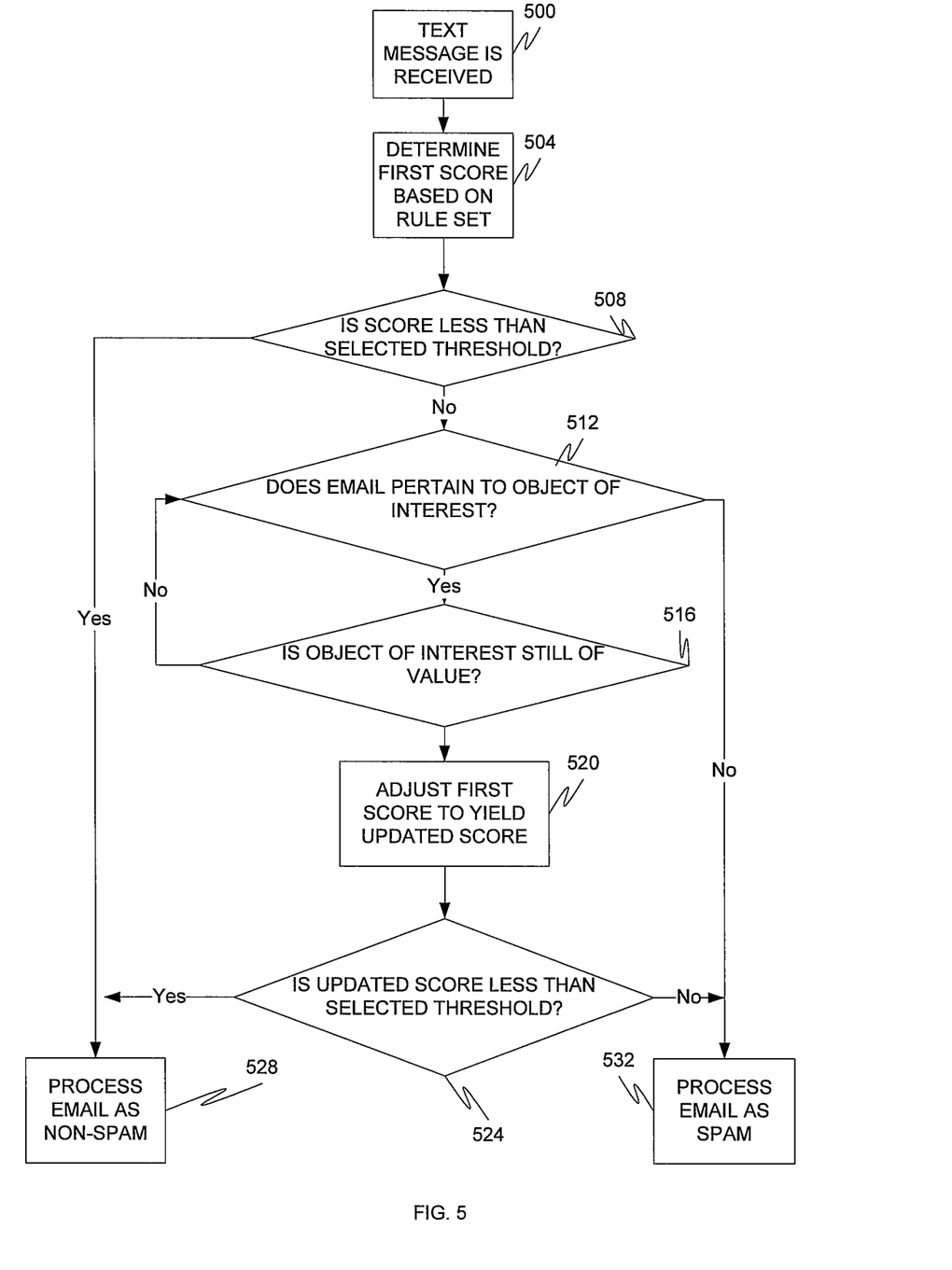
FIG. 5 is a flowchart of a spam filter according to an embodiment of the present invention.

An operation of the spam filter 132 will now be discussed with reference to FIG. 5.

In step 500, a text message, which is described as an email, is received.

In step 504, known techniques are used to determine a first score based on one or more rule sets. In one configuration, the first score is based on content analysis. This step may be performed using any e-mail content analyzing techniques, including those referenced above.

In optional decision diamond 508, the filter determines whether the score is less than a selected threshold. If so, the e-mail is deemed to be non-spam, and the filter proceeds to step 528. In one configuration, the decision diamond is replaced, or augmented, with a decision diamond whether the e-mail source address is on a whitelist. When the source address is on the whitelist, the filter proceeds to step 528 as there is no need to analyze the e-mail further. To conserve scarce processing resources, the whitelist check can be performed before any content analysis of the e-mail is performed.

When the score is less than the selected threshold, the filter in decision diamond 516 determines whether the e-mail pertains to an object of interest. This is generally determined by focusing on one or more fields of the email. For example, all or part of the source address is compared to the objects of interest. In another example, the subject matter field and body of the message is parsed for one or more objects of interest.

In decision diamond 516, the filter 132 determines whether or not the object of interest is still of value; that is, the filter 132 determines whether the persistency life of the object has expired. When expired, the filter 132 returns to and repeats decision diamonds 512 and 516 with respect to a further object of interest, if present. When the object is not expired and is still of interest, control passes to step 520 (after no further objects of interest are found to be present in the message).

The filter, in step 520, applies a first adjustment to the score. In one configuration in which a higher the score or rating means a greater likelihood that the e-mail is spam, the score is reduced by a first determined amount. The first determined amount is based on the relevancy, or probative value 224, of an object of interest that is in the message. In one configuration, where multiple objects of interest are in a common text message the first adjustment is the sum of the probative values of each of the message's objects. Different probative values are commonly assigned to different objects because certain objects of interest are deemed to be more probative of the user's interests than others. For example, a cookie's contents are generally (but not always) less probative than a highly filtered dynamic web page. That is, the transaction type and data source are indicative of the probative value. Different predetermined amounts are associated with different levels of probative value.

In decision diamond 524, the filter determines whether the (HAM) score is less than the selected threshold. If so, the e-mail is processed as non-spam in step 528. If not, the e-mail is processed as spam in step 532.

A number of variations and modifications of the invention can be used. It would be possible to provide for some features of the invention without providing others.

For example in one alternative embodiment, the scoring or rating scale is reversed. In other words, when the e-mail has a score less than the selected threshold it is considered to be spam, and when it has a score greater than the selected threshold it is considered to be non-spam. In that event, the first and second adjustments are upwards and the third adjustment is downwards.

In another embodiment, the object can be used to be associated with a lack of interest by the user. For example, when the user is selecting links in a dynamic web page the unselected links can be used to indicate areas of little or no interest to the user.

In another alternative embodiment, the present invention is applied to electronic text messages other than e-mail. For example, instant or Short Message Service or SMS messages could be considered spam and need spam filtration. In this embodiment, selected characters in the instant message handle would be compared to selected characters in stored web site addresses to assist in spam detection.

In another embodiment, objects of interest are used to form a temporal whitelist or blacklist that is different from the user configured whitelist or blacklist. In other words, the spam filter 132 creates a "middle ground" between time insensitive absolute permission and prohibition.

In another embodiment, the user is interactively involved in the spam filter's operations. The user may be asked, for instance, for his or her permission to add or remove an object of interest to or from a whitelist or blacklist. To avoid overly burdening the user, the decision whether or not to seek the user's assistance could be based on the probative value 224. Only for specified probative value levels, the user could be involved.

In another embodiment, the user is able to edit the data structures of FIGS. 2-3. There may be situations, for example, where the user does not want to receive emails about an interest of the user. This can be addressed by the user deleting the object of interest from the data structures.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) receiving an electronic text message addressed to a user;
   (b) determining a likely interest of the user in the electronic text message using at least one of the following objects:
   at least part of a search query provided to a search engine;
   content of a cookie;
   a live voice electronic address; and
   an entry in an electronic calendar of the user;
   wherein a persistency life is assigned to the at least one of the objects, wherein the persistency life indicates a temporal life of the at least one of the following objects, and wherein the at least one of the following objects is deleted when the temporal life has expired; and (c) based on a determined likely interest of the user, determining whether the electronic text message is spam or non-spam.

2. The method of claim 1, wherein at least part of a search query provided to a search engine is used to determine a likely interest of the user.

3. The method of claim 2, wherein a probative value of the search query to an interest of the user is based on at least one of a duration of the search, a frequency of use by the user of the search terms, a web site selected by the user during the search, and an outcome of the search.

4. The method of claim 1, wherein a content of at least one web page selected by the user during a browsing session in addition to the at least one of the objects is used to determine a likely interest of the user.

5. The method of claim 4, wherein the content is a tag associated with a link selected by the user.

6. The method of claim 1, wherein a content of a cookie is used to determine a likely interest of the user.

7. The method of claim 1, wherein a live voice electronic address is used to determine a likely interest of the user and wherein the electronic address is a telephone number.

8. The method of claim 1, wherein an entry in an electronic calendar is used to determine a likely interest of the user.

9. The method of claim 1, wherein, in step (b), a probative value is assigned to the at least one of the objects, wherein a probative value is used to adjust a HAM score assigned to the message, the HAM score indicating a likelihood that the message is spam or non-spam.

10. A non-transitory computer readable medium comprising processor-executable instructions for performing the steps of claim 1.

11. A system, comprising:
a spam filter operating on a processor to identify based on a likely interest of a user, electronic text messages addressed to the user as being spam or non-spam and determine a likely interest of the user using at least one of the following objects:
at least part of a search query provided to a search engine;
content of a cookie;
a live voice electronic address; and
an entry in an electronic calendar of the user,
wherein a persistency life is assigned to the at least one of the following objects that was used to determine the likely interest of the user, wherein the persistency life is a measure of a time period over which the at least one of the following objects is deemed to be probative of user interest and wherein the at least one of the following objects are removed from consideration when the persistency life expires.

12. The system of claim 11, wherein at least part of a search query is used to determine a likely interest of the user.

13. The system of claim 12, wherein a probative value of the search query to an interest of the user is based on at least one of a duration of the search, a frequency of use by the user of the search terms, a web site selected by the user during the search, and an outcome of the search.

14. The system of claim 11, wherein in addition to the at least one of the objects a content of at least one web page selected by the user during a browsing session is used to determine a likely interest of the user.

15. The system of claim 14, wherein the content is a tag associated with a link selected by the user.

16. The system of claim 11, wherein a content of a cookie is used to determine a likely interest of the user.

17. The system of claim 11, wherein a live voice electronic address is used to determine a likely interest of the user and wherein the electronic address is a telephone number.

18. The system of claim 11, wherein an entry in an electronic calendar of the user is used to determine a likely interest of the user.

19. The system of claim 11, wherein a probative value is used to adjust a HAM score assigned to the message, the HAM score indicating a likelihood that the message is spam or non-spam.

* * * * *